Jan. 5, 1926.
G. B. FLINT
1,568,594
CONVEYING MECHANISM
Filed July 18, 1925
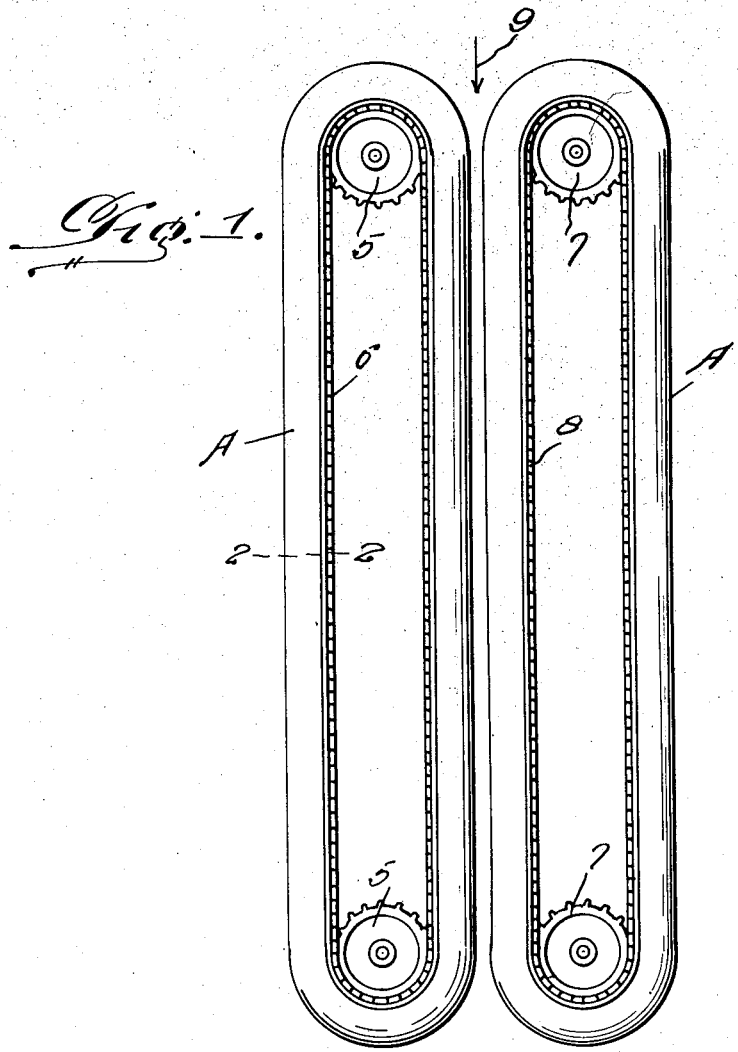
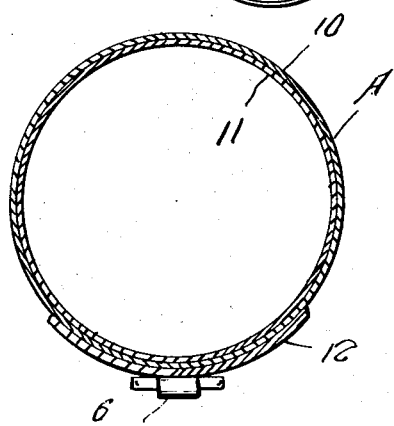
Inventor
G. B. Flint,
By Clarence A. O'Brien
Attorney Patented Jan. 5, 1926.

1,568,594

UNITED STATES PATENT OFFICE.

GEORGE B. FLINT, OF KAYSVILLE, UTAH.

CONVEYING MECHANISM.

Application filed July 18, 1925. Serial No. 44,485.

*To all whom it may concern:*

Be it known that I, GEORGE B. FLINT, a citizen of the United States, residing at Kaysville, in the county of Davis and State of Utah, have invented certain new and useful Improvements in a Conveying Mechanism, of which the following is a specification.

The present invention relates to a conveying mechanism and has for its principal object to provide a structure including a pair of endless members operable so that adjacent runs thereof move in the same direction for conveying an article therebetween in said direction.

Another very important object of the invention is to provide a conveying mechanism of this nature wherein the endless members are constructed of pneumatic tubing or of material of a resilient nature so as to compensate for different sizes in the articles being conveyed thereby.

A still further very important object of the invention is to provide a conveying mechanism of this nature which is exceedingly simple in its construction, strong, durable, inexpensive to manufacture, efficient and reliable in operation, not likely to easily become out of order, and otherwise well adapted to the purpose for which it is designed.

With the above and numerous other objects in view which will appear as the description proceeds, the invention resides in certain novel features of construction, and in the combination and arrangement of parts as well be hereinafter more fully described and claimed.

In the drawing

Figure 1 is a plan view of the conveying mechanism, and

Fig. 2 is an enlarged section taken on the line 2—2 of Fig. 1.

Referring to the drawing in detail, it will be seen that a pair of sprockets 5 are mounted for rotation in spaced relation and have trained thereover a chain 6. A similar pair of sprockets 7 are mounted for rotation in spaced relation to each other and have trained thereover a chain 8. The runs of the chains 6 are parallel to the runs of the chain 8 and the inner runs of these chains are adapted to move in the same direction as is indicated by the arrow 9.

An endless member indicated generally by the letter A is fixed to each chain and is of a resilient nature. In the present instance, each endless member A is formed with a tubular casing 10 and an inflatable inner tube 11. The casing 10 is fixed to a belt 12 of the endless variety which is secured in any suitable manner along its median longitudinal dimension to the chain 6, 8.

It will be seen that when the chains 6 and 8 are in operation, and an article enters the runs adjacent each other at the arrow 9, it will be engaged by the resilient endless members A and carried along and delivered to the other end of the mechanism.

It is thought that the construction, operation, and advantages of the invention will now be clearly understood without a more detailed description thereof. This mechanism may be utilized in a large variety of different ways, and one particular use thereof has been found in a beet digger and topping machine. The digging or plowing units deliver the beets to the position of the arrow 9 and said beets are conveyed or elevated by this mechanism to a suitable topping structure and then into a suitable receptacle. The pneumatic or resilient nature of the members A will allow the conveyer to elevate different sized beets without any danger of injuring said beets as said members A will give depending upon the size of the beets. The present embodiment and use mentioned have been given merely by way of example since in actual practice they have been found desirable, efficient and reliable.

It is apparent that numerous changes in the details of construction, in the materials, in the sizes, and in the combination and arrangement of parts may be resorted to without departing from the spirit or scope of the invention as hereinafter claimed, or sacrificing any of its advantages.

Having thus described my invention, what I claim as new is:—

1. In a conveying mechanism, of the class described, a pair of endless members formed of pneumatic tubing and trained to provide parallel adjacent runs movable in the same direction.

2. In a conveying mechanism of the class described, two pairs of sprockets, chains trained over said sprockets so as to have parallel adjacent runs, and an endless member in the form of a pneumatic tube attached to each chain.

3. In a conveying mechanism of the class described, two pairs of sprockets, chains trained over said sprockets so as to have parallel adjacent runs, an endless member in the form of a pneumatic tube attached to each chain, each endless member including an outer casing and an inner tube which is inflatable.

In testimony whereof I affix my signature.

GEORGE B. FLINT.